United States Patent Office 3,743,514
Patented July 3, 1973

3,743,514
HYDROLYSATE OF COLLAGEN AS A SAUSAGE INGREDIENT
Floyd C. Olson and Jack C. Trautman, Madison, Wis., assignors to Oscar Mayer & Co. Inc., Madison, Wis.
No Drawing. Continuation of application Ser. No. 74,178, Sept. 21, 1970. This application Sept. 14, 1972, Ser. No. 289,117
Int. Cl. A22c 11/00
U.S. Cl. 99—109    8 Claims

ABSTRACT OF THE DISCLOSURE

Water-soluble, low free-amino acid, non-gelling hydrolysate of collagen is used as low-cost, high protein ingredient in the manufacture of sausage, imitation sausage and loaves.

---

This is a continuation of application Ser. No. 74,178, filed Sept. 21, 1970, now abandoned.

This invention relates to the manufacture of sausages, generally, and is used to particularly good advantage in the manufacture of low-fat wieners.

Collagen is the protein in connective tissue. Large quantities of collagen are now available, directly and as hydrolysate, and greater quantities are potentially available, as a by-product of the meat industry. For example, by steam rendering the separated skin and fat cell membranes from continuous rendering, a water-soluble protein material known as "tankwater" is produced. This soluble protein material is presently commercially produced as a by-product in connection with the steam rendering of fat to produce lard. After lard is drawn off and the lard tankwater is filtered, the filtered tankwater is concentrated, e.g., in a triple effect evaporator, to 60–70% solids. This is known as "stick."

It has been estimated that 500 million pounds of such dry solids could be available annually from the pork industry in the United States. The quantity of beef collagen, or beef collagen hydrolysate which could be produced is likewise an extremely large quantity. It is highly desirable to provide an effective use for collagen, particularly for the collagen hydrolysate produced in the steam rendering of fat.

It is an object of this invention to provide a method of manufacture of sausage and imitation sausage which effectively utilizes collagen hydrolysate by-product of the class described herein.

It is another object of the invention to provide a sausage which utilizes substantial levels of collagen hydrolysate, which sausage does not exhibit off-flavor characteristics.

Gelatin pockets sometimes form in sausages containing too much collagen. Such gelatin pockets are considered undesirable. It is a further object of this invention to provide a method of manufacture of sausage which, upon cooking, does not result in the formation of gelatin pockets in the sausage product.

These and other objects which will be apparent hereinafter are produced in accordance with this invention by including as an ingredient water-soluble, low free-amino acid, non-gelling hydrolysate of collagen in a batter formulated for sausage or imitation sausage.

This invention is applicable to the manufacture of sausages and imitation sausages generally, and is used to particularly good advantage in the manufacture of low-fat wieners, for example. The term sausages, in accordance with the use herein, is intended to include a comminuted meat food product from beef, pork, sheep, or goats with no more than 3½% additive, such as cereal or non-fat dry milk, and no more than 10% additive water, with added salt and flavoring. Uncooked sausage, such as pork sausage, may have no more than 3% added water. It is contemplated that in addition to use in the manufacture of a sausage such as wieners, the improvement of this invention can be used in connection with the manufacture of imitation sausage and loaves such as meat loaves, and non-descript non-meat loaves, as well, to increase the protein content thereof. Imitation sausage is a product in sausage form that does not meet the requirements of "sausage" as set forth hereinbefore.

Generally speaking, in accordance with this invention the special hydrolysate of collagen can be used wherever use of hydrolyzed plant protein is indicated. For example, at page 97 of the Official Meat Inspection manual, section 317.62 states that hydrolyzed plant protein may be used as an ingredient of sausage, meat loaf and luncheon meat, as well as in other products. Section 317.63 states that hydrolyzed plant protein may be used in products such as hamburger, chopped beef, cubed steak, and steak prepared from meat that has been molded after comminuting processes such as grinding, chopping, thin slicing and the like. In the numbered examples below, the use of the invention in the manufacture of pickle and pimento loaf is illustrated. Thus the special hydrolysate can be used, in accordance with this invention, in cooked and fresh sausage, meat loaves hamburger, luncheon meat, loaves, imitation sausage, patties and other products in amounts between 0.1 and 3.0% to good advantage, and even higher amounts may be used.

As used herein the term "low-fat wiener" is intended to include wieners having fat content in the range of 10–20% by weight based on the weight of the wiener.

To understand the definition of the term "hydrolysate of collagen" which is used in accordance with this invention it must be appreciated that collagen is capable of being hydrolyzed to various degrees of hydrolysis, and the hydrolysate produced at the various degrees or levels of hydrolysis have physical and physiological characteristics which differ markedly. For example, gelatin is obtained from collagen by limited controlled cooking, that is by heating in water at specified pH and temperature. The gelatin produced in this manner forms a gel at low temperatures, such as 40° F. and a sol at elevated temperatures such as 160° F. Further cooking and hydrolysis of collagen produces "animal glue."

Still further cooking under steam pressure produces soluble collagen hydrolysate which does not show any gelling properties. The hydrolysate of collagen at this stage can also be referred to as a "peptone" as it is a partially hydrolyzed protein, soluble in water, non-coagulable by heat, and not precipitated by saturating the solutions with ammonium sulfate. Such non-gelling hydrolysate of collagen is the material which is useful in accordance with this invention. An additional distinguishing property of this material is that approximately half of the hydrolysate at this degree of hydrolysis will pass a dialyzing membrane which permits molecules up to 10,000 molecular weight to pass, whereas, only about 5% or gelatin would pass through such a membrane.

The collagen hydrolysate intended for use in accordance with this invention also has a relatively low free-amino acid content. For example, a preferred low free-amino acid hydrolysate for use in accordance with this invention has amino nitrogen less than 8%, more preferably in the range 4–8%, of the total nitrogen present. It is noted that hydrolysate of collagen produced by acid hydrolysis contains relatively extremely high amino nitrogen, e.g., 40–70% amino nitrogen based on the weight of the total nitrogen present. The hydrolysis of protein by acid is often accompanied by off-flavors. However, non-acid steam hydrolysis as described above, to the peptone stage, for use in accordance with this invention, does not give off-flavor. While we do not intend to be bound by any theories we believe the off-flavor present in the hydrolysate of collagen produced by acid hydrolysis is attributable to the presence of certain free amino acids.

Non-acid steam hydrolysis of collagen to the stage of hydrolysis referred to above does not give off-flavor, and yields polypeptides with substantially no amino acid and relatively low level of amino nitrogen. No real flavor develops, other than an acceptable brothy flavor. Thus, the hydrolysate of collagen used in accordance with this invention is characterized as a water-soluble, low free-amino acid, non-gelling protein material.

In the following examples, which are provided for illustrative purposes only, all parts are parts by weight, and all percent (%) are expressed as percent by weight based on the weight of the mixture being referred to, unless otherwise specified. All temperatures herein are expressed in degrees Fahrenheit.

EXAMPLE 1

The purpose of this example is to illustrate a preferred method for the manufacture of the hydrolysate of collagen intended for use in accordance with this invention.

U.S.D.A. inspected and passed edible fatty connective tissue is used in this example. This includes fatty trimmings with and without attached skin. The materials are placed in a pressure vessel and heated by direct injection of steam at 265° F. for 2.5 hours. The contents of the vessel are then permitted to settle for 1.5 hours. A rendered fat layer accumulates at the top and is drawn off separately. The lower aqueous phase is separated, filtered, and concentrated. This material is approximately 49.2% protein and is emiently satisfactory for use in accordance with this invention. The percent amino nitrogen in this material is between 4 and 8% of the total nitrogen present.

EXAMPLE 2

The procedure of Example 1 is repeated except that the contents of the vessel are heated to 240° F., which temperature is maintained for 6 hours. A similar hydrolysate of collagen is produced, and the product of this example is also eminently satisfactory for use in accordance with this invention.

EXAMPLE 3

The procedures of Examples 1 and 2 are repeated in respective illustrative embodiments, except that, instead of the connective tissue used therein as a starting material, the residue from continuous lard rendering such as described in Downing 2,823,215 is steam cooked to give peptone.

The peptone produced in accordance with each of the above illustrative examples are liquid concentrates. These concentrates may be spray-dried to provide a product with about 95% protein.

EXAMPLE 4

The product produced in accordance with the procedure of Example 1 hereinbefore is spray-dried using sanitary food processing techniques. The spray-dried product has the following analysis:

TABLE 1

| | Percent |
|---|---|
| Moisture | 4-6 |
| Nitrogen | 15-16 |
| Amino acid content: (mg./gm. sample): | |
| Alanine | 76.5 |
| Arginine | 65.0 |
| Aspartic | 61.4 |
| Cystine | 0.7 |
| Glutamic | 108.0 |
| Glycine | 20.9 |
| Histidine | 14.5 |
| Hydroxyproline | 46.2 |
| Isoleucine | 17.4 |
| Leucine | 38.6 |
| Lysine | 43.4 |
| Methionine | 9.9 |
| Phenylalanine | 22.8 |
| Proline | 97.8 |
| Serine | 32.4 |
| Threonine | 21.3 |
| Tryptophan | 1.7 |
| Tyrosine | 12.8 |
| Valine | 26.9 |

EXAMPLE 5

The purpose of this example is to illustrate a preferred embodiment of the process of this invention in which a low-fat wiener is manufactured.

Ingredients were admixed in accordance with the following formula:

| | Lbs. |
|---|---|
| Cow meat | 27.0 |
| Pork 80 | 54.4 |
| Pork 50 | 2.0 |
| Peptone (49.2% prot.) | 7.1 |
| Salt | 3.4 |
| Corn syrup solids | 2.5 |
| Dextrose | 1.6 |
| Spice | 0.7 |
| Cure mix | 0.3 |
| Water | 23.0 |

The above ingredients, after being thoroughly admixed and comminuted, are stuffed into wiener casings, and linked. The connected links are smoked, cooked and skinned in accordance with known commercial methods (see U.S. Pat. 3,170,797 to Sloan and Ahern, Continuous Manufacture of Small Smoked Sausages). The resulting wieners are found to have no off-flavor.

It is noted that upon cooling of the sausage, the hydrolysate of collagen does not accumulate within the sausage or form a gel similar to the gel pockets formed when gelatin is present due to high levels of collagen in a sausage. This is believed to be the consequence of the fact that, in accordance with this invention, the hydrolysate of collagen utilized as an ingredient has been hydrolyzed past the gel stage so that it can not form a gel.

EXAMPLE 6

This example illustrates the application of this invention to the manufacture of a loaf product. The following ingredients were intimately admixed:

| Pickle and pimento loaf: | Lbs. |
|---|---|
| Pork (80% lean) | 50.0 |
| Pork (70% lean) | 25.0 |
| Partially defatted pork fatty tissue | 25.0 |
| Rework (P & P Loaf) | 10.0 |
| Nonfat dry milk | 16.4 |
| Hydrolyzed collagent protein (Example 4) | 4.0 |
| Pickles | 6.8 |
| Pimentos | 5.6 |
| Water | 36.0 |
| Corn syrup | 10.0 |
| Spice, cure, salt, mustard | 7.0 |
| | 195.8 |

The resulting admixed ingredients were shape into a loaf and cooked. The resulting delectable product was observed to have excellent physical characteristics. The final product analysis showed:

| | Percent |
|---|---|
| Water | 56.4 |
| Protein | 13.9 |
| Fat | 15.8 |
| NaCl | 2.9 |

It is further noted that tryptophan and isoleucine are present in relatively low levels in the high solids hydrolysate of collagen produced in accordance with Example 4 above. However, in accordance with this invention, other proteins from meat in the sausage will contain enough tryptophan and isoleucine to take care of the requirements. The hydrolysate of collagen, in accordance with this invention, is used in an amount to provide protein in an amount between 4 and 30% of the total protein; an amount sufficient to provide protein up to 10% of the total protein being perferred. It is noted that sausage is often eaten with a cereal product such as bread or buns. The protein of wheat is deficient in lysine. The protein of wheat is thus advantageously supplemented by the protein material used in accordance with this invention, the latter being richer in lysine. Thus the proteins of the meat and collagen hydrolysate will supplement the protein of wheat in such instances.

It has been appreciated that, in order to make a low-fat wiener, additives must be added. Flour, soy flour, and non-fat dry milk are usually added. However, in accordance with this invention, the hydrolysate of collagen which is animal-derived, water-soluble, low in free-amino acid, and non-gelling, is used to good advantage to build up the protein content.

In accordance with this invention, therefore, the hydrolysate is readily distributed evenly with the aqueous phase throughout the ingredients which make up the sausage or imitation sausage batter, and it remains uniformly distributed throughout the aqueous phase upon the manufacture of cooked, or uncooked sausage or imitation sausage.

The use of pork, beef and other edible animal hydrolysate is contemplated for use in accordance, with this invention. It is essential that the hydrolysis of collagen be carried out under conditions such that a very low level, and preferably, substantially no free-amino acids are produced thereby, and that the hydrolysis be continued to such an extent that the protein materials resulting therefrom are water-soluble, and non-gelling. It is preferred that hydrolysis be continued until at least 40% of the protein materials in the hydrloyzed aqueous protein dispersion is able to pass through a dialyzing membrane which permits up to 10,000 molecular weight material to pass through.

We claims:

1. A method of manufacturing a meat product including the steps: hydrolyzing collagen by non-acid steam hydrolysis, said hydrolysis being continued to sufficiently hydrolyze the collagen to convert the protein therein to nongelling water-soluble condition, in which the amino nitrogen content of the hydrolysate is less than 8% by weight based on the weight of the total nitrogen present; and in which the resulting hydrolysate contains substantially no free amino acid; admixing the resulting hydrolysate with a meat ingredient in an amount sufficient to provide protein in an amount between 4–30% of the total protein in the meat product, said hydrolysate being used in an amount sufficient to provide between 0.1 and 3% based on the weight of the meat product.

2. The meat product produced by the method of claim 1.

3. A method of manufacturing sausage or imitation sausage including the steps: hydrolyzing collagen by a non-acid steam hydrolysis step which is continued to sufficiently hydrolyze the collagen to convert the protein therein to non-gelling water-soluble condition in which the resulting hydrolysate has substantially no free amino acid and in which the amino nitrogen content thereof is less than 8% by weight based on the total weight of the nitrogen present; admixing the resulting hydrolysate with sausage ingredients, said resulting hydrolystate being added in an amount sufficient to provide protein in an amount between 4–10% of the total protein in the sausage.

4. The sausage product produced by the method of claim 3.

5. Method of manufacturing a meat product including the steps: hydrolyzing collagen by non-acid steam hydrolysis, said hydrolysis being continued to sufficiently hydrolyze the collagen to convert the protein therein to a non-gelling water-soluble condition in which the amino nitrogen content of the hydrolysate is less than 8% by weight based on the weight of the total nitrogen present; and in which the resulting hydrolysate contains substantially no free amino acids; concentrating the hydrolysate to a hydrolysate concentrate having between 40–95% protein, and admixing the hydrolysate concentrate with a meat ingredient in an amount sufficient to provide protein in an amount between 4–30% of the total protein in the meat product, said hydrolysate being used in an amount sufficient to provide between 0.1 and 3% based on the weight of the meat product.

6. The product produced by the method of claim 5.

7. A method of manufacturing sausage or imitation sausage including the steps: hydrolyzing collagen by a non-acid steam hydrolysis step which is continued to sufficiently hydrolyze the collagen to convert protein therein to non-gelling water-soluble condition in which the resulting hydrolysate has substantially no free amino acid and in which the amino nitrogen content thereof is less than 8% by weight based on the total weight of the nitrogen present; concentrating the resulting hydrolysate to a hydrolysate concentrate having between 40–95% protein, admixing the resulting hydrolysate concentrate with sausage ingredients, said concentrate being added in an amount sufficient to provide protein in an amount between 4–10% of the total protein in the sausage.

8. The sausage product produced by the method of claim 7.

References Cited
UNITED STATES PATENTS

| | | | |
|---|---|---|---|
| 2,823,215 | 2/1958 | Downing | 260—412.6 |
| 3,113,030 | 12/1963 | Brody | 99—108 |
| 3,170,797 | 2/1965 | Sloan et al. | 99—109 |
| 3,539,357 | 11/1970 | Appleman | 99—107 |
| 3,552,978 | 1/1971 | Inklaar | 99—107 |
| 3,649,301 | 3/1972 | Stump et al. | 99—109 |
| 3,650,767 | 3/1972 | Stump et al. | 99—109 |

HYMAN LORD, Primary Examiner